Nov. 12, 1935.  H. J. BREITENBACH  2,020,765
HYDRAULIC FEED
Filed June 23, 1928  3 Sheets-Sheet 1

Inventor
Herman J. Breitenbach
By
Attorneys

Nov. 12, 1935.   H. J. BREITENBACH   2,020,765
HYDRAULIC FEED
Filed June 28, 1928   3 Sheets-Sheet 2

Inventor
Herman J. Breitenbach
By Wood & Wink
Attorneys

Nov. 12, 1935.  H. J. BREITENBACH  2,020,765
HYDRAULIC FEED
Filed June 23, 1928  3 Sheets-Sheet 3

Inventor
Herman J. Breitenbach
By Wm & Wm
Attorneys

Patented Nov. 12, 1935

2,020,765

UNITED STATES PATENT OFFICE 2,020,765

HYDRAULIC FEED

Herman J. Breitenbach, Cincinnati, Ohio, assignor to The Lodge & Shipley Machine Tool Company, Cincinnati, Ohio, a corporation of Ohio Application June 28, 1928, Serial No. 288,902

18 Claims. (Cl. 82—2)

This invention relates to a hydraulic feeding system for machine tools, and to the application of hydraulics for the reciprocation of a carriage of an engine lathe adapting the carriage to be reciprocated in either forward or reverse directions at normal feeding rates and at rapid traverse rates by a single piston in direct connection with the carriage.

In the present state of the art, the method almost universally employed for the application of hydraulics to machine tool feeding means, where uniformity of movement is required against varying resistance, and at the same time providing for variation of the rate of feed movement selectively, is by variation in volume delivery from the pump or source, which may be accomplished in a number of ways. For instance, a common method is by variation in the stroke of the pump piston. Another is by employing a plurality of pumps, using them in combination or singly, etc. All of which require complicated structures and consequent expense; they also occupy considerable valuable space.

In this device, any commercial means may be employed capable of delivering liquid in sufficient volume under required pressure.

An object of the invention is to provide a hydraulic feeding mechanism for machine tools which will move either the tool into the material or the material against a tool at a uniform feed for a steady and smooth movement, regardless of any variation in feeding pressure, as may be due to a change in the depth of cut either in an increasing or decreasing capacity, or other operating conditions.

The changes in feeding pressure may occur rapidly or momentarily as by successive impacts of the cutter or eccentricity of the cutter or work. It is therefore necessary that the forward pressure be variable but automatically adjusted to meet the various working conditions in an efficient and simple manner. This is accomplished by means of a constant volume pump and a valve device, the valve device including a pressure actuated valve, one side of the valve connecting with the cylinder at the power side of the piston, the valve adapted to be influenced by the pressure in the cylinder, and at an opposite side, a valved and variable by-pass or pump pressure relief in connection with the pump, and a definite sized or regulatable restriction valve in the line connecting the pump and cylinder, the variable by-pass valve establishing a definite and uniform differential between the pressures at the opposite sides of the restriction valve, resulting in a certain fixed rate of flow to the cylinder regardless of any variation in feeding pressure.

The variable by-pass valve is preferably a weighted valve to cause a constant and uniform pressure differential between the cylinder and the pump which is quick in operation and thus maintains a relation between the cylinder pressure and the pump pressure with no appreciable surging, which may cause detrimental irregularity of tool movement. This automatic control is primarily governed by the pressure in the cylinder on the power side of the piston, the fluid exhaust at the opposite side of the piston being through a restricted port during the feeding motion of the piston, which may be of definite area or through a variable relief valve, as conditions may require.

From the variable by-pass or differential valve as it will be hereinafter designated extends two passageways one of which is connected to the cylinder and the other of which is connected preferably to a reservoir since this second passageway constitutes an escapement for the surplus fluid. In the preferred form adapted to meet more variable working conditions the passageway between the differential valve and the cylinder is provided with a feed constrictor which is manually set to provide a predetermined cross section for the passage of the fluid to the cylinder. Where more uniform working conditions are anticipated this constriction may be constant or may be simply constituted by the size of the connecting pipe chosen. The escape passageway is provided with a constrictor adapted to vary its cross section automatically.

As disclosed, the differential valve consists of a weighted valve member disposed in a tapered passageway in the escape line. As the source of pressure drives the liquid through the passageways to the cylinder, the weighted valve member in the escape passageway develops a pressure at the source greater than the pressure in the cylinder. If the pressure in the cylinder remains uniform, through uniformity of resistance to advancement of the piston, the valve in the escape passageway will maintain a constant and uniform opening, allowing a uniform volumetric escape of the liquid to the source of supply, and a consequent uniform delivery to the cylinder. Should, however, resistance to advancement of the piston vary, either increasingly or adversely, the valve in the escape passage would instantly be activated through a hydraulic connection with the cylinder to decrease or increase the escape passage proportionately, thereby maintaining a constant and uniform relation between the pressure at the source and that in the cylinder which will cause a uniform volume of liquid to be delivered to the cylinder regardless of varying resistance to advancement of the piston.

The differential in pressure is governed by a constant weight and the variations in pressure between cylinder and pump at the opposite sides of the valve, resulting from any change in feeding pressure causing increasing or decreasing pump and cylinder pressures, the valve being capable of being alternately influenced by either the cylinder or pump pressure, with the weight maintaining a definite and constant differential, so that the volume of liquid and rate of flow to the cylinder will be uniform at either increased or decreased pressures, so that the advancing rate of the piston will be uniform regardless of any opposing pressure applied thereon within the working limits of the tool instituted by a change in depth cut.

This may be further exemplified by the fact that liquid will flow through a given orifice at a uniform rate, provided there is a uniform difference of hydraulic pressure on each side of the orifice. Assuming that one hundred pounds is on one side and eighty pounds on the opposite side, liquid will flow through at a certain given rate. If the two pressures are increased, say to two hundred pounds on one side and one hundred and eighty pounds on the other side, the same amount of liquid will flow through the orifice as in the first case, the weighted valve maintaining the constant differential.

Now assumed that it requires twenty-five pounds hydraulic pressure in the front end of the cylinder to move the piston and its load toward the cut, this pressure is also applied upon the upper side of the plunger in the valve forcing it downward, causing an increased choke to the pump pressure relief and consequent rising pressure. This movement is opposed by the pressure from the pump acting on the lower end of the valve, but the pressure on the lower end of the valve would be greater than on the upper end by an amount equal to the weight, causing a higher pressure on one side than on the other, which will give a certain fixed rate of flow through the given orifice leading to the cylinder, and cause uniform movement of the piston.

When the tool feeds into the cut the hydraulic pressure in the front end of the cylinder and upper side of the valve rises, forcing the plunger down, causing an increase in the choke to the relief of the volume from the pump and rise in pressure, giving the same difference as before the tool fed into the cut but under high pressure to accommodate for the increase demanded in the feeding pressure.

The system is easily applicable to a type of machine tool carriage as shown and described in Letters Patent No. 1,600,401, dated September 21, 1926, in which the carriage traverse and tool slide feed is obtained through a member reciprocable longitudinally of the bed of the lathe, and therefore, can be operated by a single piston. The degree of reciprocation of the piston governs the tool slide movement independent of the carriage, and the carriage and tool slide as a unit for obtaining definite working cycles which can be readily varied through the control of the moving piston.

The hydraulic system is extremely flexible and easily manipulated either automatically or by the operator and adapting the degree of piston movement to be quickly and accurately controlled for obtaining a definite working cycle of the tool slide or cutting tool, and this in either direction of the moving piston irrespective of any rate of travel or movement of the piston. Likewise the feeding rate from a minimum to a maximum can be changed instantly, or the change allowed to take place gradually as may be predetermined by suitable mechanical or pressure controlling devices for functioning or controlling the operation of the hydraulic system.

The system enables the use of a commercial constant volume delivery pump, preferably of a large volume gear type, a control valve for piston direction and rapid traverse control, a differential pressure valve device of preferred design operable automatically for uniform feed regardless of changes in feeding pressure, a back pressure relief valve, and the throttle device (either automatically or manually operated) for changing the volume of flow to vary the rate of piston movement for variable feed.

The application of hydraulic feeding mechanism to the type of machine tool carriage, as referred to in the previously mentioned patent, is easily made without material change in the machine tool organization, by merely substituting a feed rod for the screw feed shaft extending longitudinally of the engine lathe bed, and engaged through the carriage. The feed rod is susceptible to be manually moved for setting, the rod being connected axially to a piston rod of the hydraulic system. A single power piston only is required for moving the tool slide and its tool upon the carriage and independent of the carriage for either moving the tool toward or from the work and with the carriage as a unit for feeding or moving the tool longitudinally of the work.

Other objects and certain advantages will be more fully set forth in a description of the accompanying drawings forming a part of this specification, in which:

Figure 1 is a diagrammatic layout of the hydraulic feeding and traversing system connected to the carriage of an engine lathe, showing the main control valve of the system set for a rapid traverse of the carriage to the left, and showing the valve for controlling the direction of feed set for feeding the carriage to the right when the main control valve is properly set for feeding carriage movement.

Figure 6:
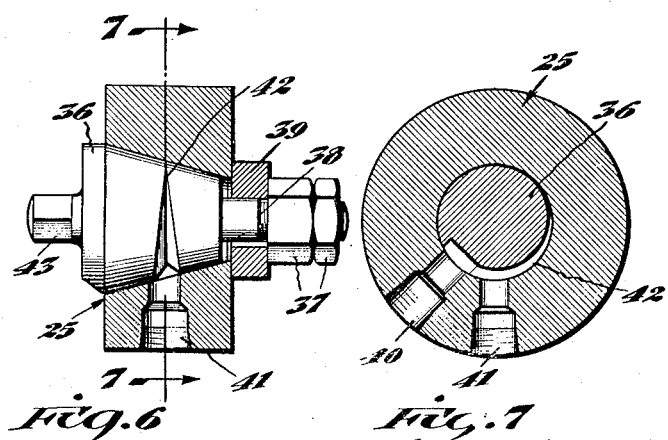
Figure 6 is a sectional view taken centrally of the throttle valve adaptable for use in this system.

Figure 6, further detailing the construction of the throttle valve.

Figure 8:
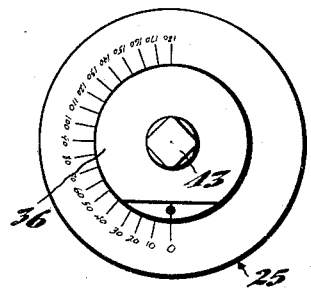

Figure 8 is a front elevation of the valve illustrating the graduation marks on the face thereof in combination with the rotatable valve body for obtaining definite setting for any required feed.

Referring to the drawings, 1 indicates a cylinder of the hydraulic system suitably secured to the machine tool in relation to the part of the machine to be fed by the piston 2 within the cylinder connecting with the piston rod 3 engaging through a stuffing box of the cylinder head 4, these elements constituting a converter for the hydraulic force. The construction of the piston and cylinder may follow any prevailing practice to meet the requirements, with the details thereof being of no special concern herein.

The opposite ends of the cylinder are in conduit connection with a control valve 5 which, as herein illustrated, is of the sliding piston type and from which various conduit connections are made to a reservoir, pump and differential pressure valve. The control valve is operated for starting, stopping, and direction reversing, either manually or mechanically through mechanical trip or actuating mechanism, the mechanical operation being through a control or trip rod operated by the part of the machine tool moved by the piston or by the piston direct at determined periods within the maximum movement of the piston, but this phase of the improvement may be variously modified in detail of construction within the concept herein presented and, therefore, is only diagrammatically presented for the purposes of disclosing a complete system as applied to an engine lathe.

The control valve represents a ported cylinder body with a piston valve 6 reciprocable therein for covering or uncovering and connecting various ports for fluid control to and from the cylinder 1. The control valve is provided with a trip or by-pass valve 7 of poppet type, manually operated by a hand lever 8, and automatically by dogs 9 for stopping the movement for either rapid traverse or feed at any point in the piston movement and in either direction of movement without affecting the position of the control valve 6.

The trip valve opens communication between port connecting chambers of the control valve and a return passage 10 leading to the reservoir 11, so that the pump delivery is by-passed to the reservoir, causing the piston to idle or stop, the piston travel continuing as soon as the trip valve is closed.

Other details of the control valve will be taken up in the description of the various circuits, rapid traverse, and feed.

The rapid traverse circuit is of simple arrangement and controlled entirely by the control valve for direction and trip valve for stopping or starting. Moving the control valve to either of its limits, right or left, causes an alternate connection of the opposite ends of the cylinder to the pump 12 and reservoir 11. The form of rapid traverse circuit as employed is common to hydraulic feeding mechanism for various machine tools, and establishes direct connection between pump and cylinder. The pump or pumping unit is of a commercial type of constant volume delivery, and is utilized for both rapid traverse and feed and, therefore, provides an inexpensive and very effective unit, with approximately the full capacity or regular running capacity of the pump utilized for rapid traverse.

For the feeding rate the excess volume escapes through the differential pressure valve to the reservoir, to be again taken up by the pump and continuously circulated, the differential valve meanwhile maintaining a uniformly greater pressure at the pump than in the cylinder.

Figure 1:
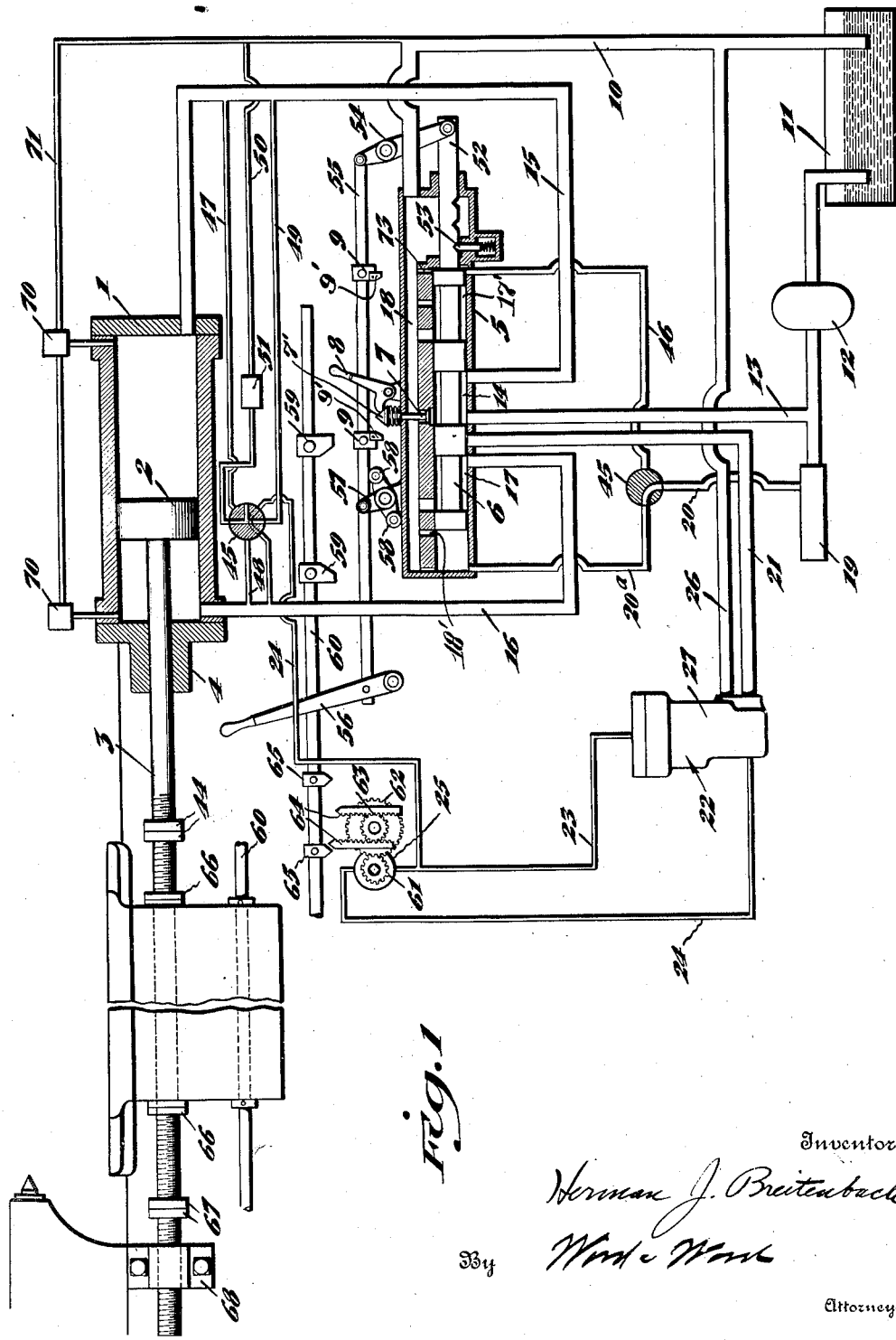

For a rapid traverse in one direction and, as illustrated in Figure 1 of the drawings, to the left, the control valve is moved to its extreme right position. This places the pump in communication with the rear end of the cylinder. The liquid will flow through a conduit or passage 13 leading from the pump into the chamber 14 of the control valve, thence through the conduit or passage 15 which is connected by the piston valve with the conduit 13 to and into the rear end of the cylinder, thus traversing the piston in a forward direction or to the left.

The exhaust from the cylinder at the opposite side of the piston is through a passage 16 leading to the control valve. A control chamber 17 of the valve communicates the conduit 16 in the control valve with the passage 18 connecting with the reservoir or tank, to be again taken up by the pump for recirculation. Movement of the piston will continue until the piston reaches the end of the stroke, whereupon the high pressure relief valve 19 is automatically opened, or until the control valve is tripped by opening the poppet valve 7.

The movement of the piston through the control valve can be either manually or automatically stopped at any point in its traverse in either direction, and the mechanism is common for rapid traverse or feed control, which will be more fully hereinafter explained.

Reversing the position of the slide valve from that shown, bringing the same to its extreme forward position, connects the rear end of the cylinder with the return passages 18 and 10 and the forward end of the cylinder with the passage 13 through the valve chamber 14 connecting the passage 13 and passage 16 within the control valve.

The feeding circuit for a lathe carriage and its tool slide is controlled by the direction of piston movement and, for moving the piston in a direction to the right, the control valve occupies an intermediate position covering the ports for the passages 16 and 15, and connects the pipe 13 with a passage 21 leading to the lower end of a differential pressure valve 22, the entire volume of the pump passing through the passage 13, valve chamber 14, passage 21, into a chamber in the differential valve wherein the flow is divided and controlled. A branch leads through a passage 24, including a throttle valve 25, to the forward end of the cylinder, through the passage 16. The relief passage 26 controlled by the differential pressure valve 22 leads back into the reservoir.

A branch passage 23 connects with the upper end of the differential pressure valve 22 and with the passage 16, through passage 24, so that the upper end of the differential pressure valve connects with the forward end of the piston cylinder, and establishes a head pressure on the differential pressure valve corresponding to the pressure within the forward end of the cylinder.

Figure 5:
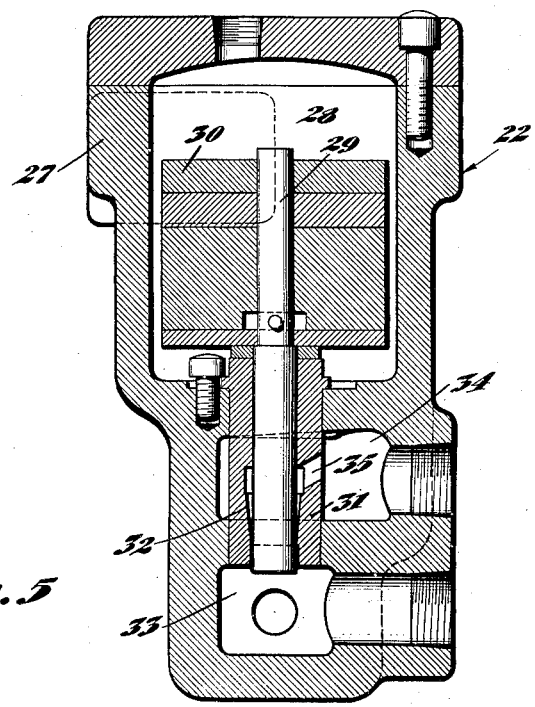
Figure 5 is a sectional view taken centrally and longitudinally of the differential pressure valve, detailing the construction thereof.

The differential pressure valve comprises (see Fig. 5) a body 27 providing a chamber 28 to which the pipe or branch passage 23 is connected for throwing a head pressure upon the plunger 29 having a weighted head 30, the plunger sliding in a bushing 31 secured within the body, the bushing at its lower end having a tapering bore 32 connecting with a passage or chamber 33 within the valve body to which the conduit or passage 21 is connected, and also with a passage or chamber 34 in the valve body above the chamber 33 thereof and a port 35 in the bushing, the chamber or passage 34 connecting with the conduit or passage 26 leading to the reservoir.

The chamber or passage 33 at the lower end of the plunger also connects with the passage 24. The plunger with its weighted head is free to slide in the bore of the bushing and the lower part of the bushing is bored with a straight hole in advance of the tapered portion. The weighted head of the plunger creates a differential pressure between the pump pressure at the lower end of the plunger and the cylinder pressure within the valve chamber 28.

Figure 7:
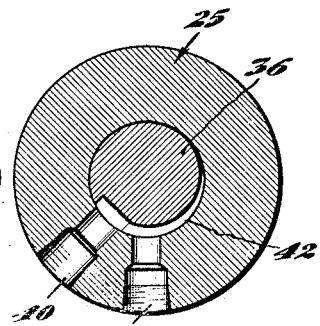
Figure 7 is a sectional view taken on line 7—7.

The throttle valve 25 interposed in the line of passage 24 regulates the feed or liquid flow to the cylinder, and through its control, variation in the rate of feed is obtained. The throttle valve in the preferred form herein employed, (see Figs. 6 to 8 inclusive), comprises a valve body having a tapered bore into which a correspondingly tapered plug valve 36 is rotatively engaged. The valve is held in place by a collar 39 engaged over the projecting stem 38 of the valve 36 and bears against the body, and retained by the lock nuts 37. The body is provided with a pair of radially disposed ports 40, 41, which are connected or sealed by the valve 36, the valve having a tapered notch 42 cut into its periphery for varying the liquid flow between the ports The head of the valve is provided with a square stem 43, as shown, for connecting a handle or lever for valve operation, or with a gear for automatic operation as illustrated in Figure 1, or both may be furnished as required. The upper side of the valve body is provided with scale or graduation marks between the limit positions of the valve to obtain a definite setting or reading for any desired feed rate.

For lathe utility, an arrangement of elements for feed movement or power traverse of the tool is for both forward and reverse directions, though any combination of direction and rate may be accomplished by suitable structure and setting.

In the capacity for feed of a lathe carriage and its tool slide, it will be assumed that the control valve 6 is shifted to an intermediate position, closing the port to the passage 15 and the port of the passage 16, and bringing the valve chamber 14 in a position to communicate from the pump with the passage 21 connecting with the differential pressure valve, whereby communication is established with the passage 24 and through throttle valve 25, with the forward side of the forward end of the cylinder for moving the piston to the right.

The differential pressure valve primarily is interposed in the feeding circuit on the power side of the piston to produce a uniform difference in pressure between the cylinder pressure and the pump pressure for a uniform feed of the piston irrespective of the degree of pressures, the degree within the maximum pump delivery pressure varying and depending upon the resistance or load thrown upon the piston, and the pressure difference is automatically governed by the differential pressure valve.

As the load is increased the pressure proportionately is increased and, conversely, as the load is decreased the pressure proportionately is reduced, the pump, however, operating at its full volme capacity at all times.

The throttle valve does not influence the pressure but is merely adapted for regulating or varying the feed and provides for readily accelerating or decelerating the rate of feed either in advance of or during the cut, and its use offers greater latitude, although not necessarily required in a machine operating at a constant rate in production use for machining the same or one kind of product. The throttle valve may have a fixed opening or a variable opening adapting it for varying the rate of feed.

The throttle valve in illustrating the system is shown as an independent element although it is apparent it could form a part of the differential valve or a unit therewith, and both valves assembled or grouped with the cylinder to the elimination of piping and reduce the same to a compact hydraulic unit.

For feeding, the volume of liquid is materially less than that required for rapid traverse, and passes through a restricted passage in order to excite the operation of the pressure regulator, which causes uniform and even flow of liquid through the restriction and consequent uniform movement of the piston, regardless of the hydraulic pressure required for the feed. The liquid will flow through a given orifice at a uniform rate provided there is a uniform difference of hydraulic pressure on each side of the orifice.

The load imposed upon the piston varies with an increase or decrease in cutting depth. An increased load would tend to retard the piston movement unless there is a corresponding increase in pressure, causing a rise in the pressure in the cylinder at the forward side of the piston, the effect being to force the plunger valve 29 in the differential valve, downwardly, causing an increased choke in the pump relief passage between passages 33 and 34 controlled by the plunger valve 29, cutting off and reducing the port area for escape of the liquid through the return passage 34, resulting in a rise in the pressure to and in the line 24 and in the forward end of the cylinder.

Pressure exerted in the upper chamber 28 of the differential pressure valve operates the plunger to force it downwardly. This movement is opposed by the pressure from the pump against the lower end of the valve, and the pressure on the lower end of the valve will be greater than on the upper end by an amount equal to the weight of the valve, causing a higher pressure in the lower valve chamber than in the cylinder, resulting in a certain fixed rate of flow into the cylinder for movement of the piston. The differential pressure valve acts very quickly without causing any appreciable surging.

Conversely, if the pressure in the cylinder lowers by reason of a reduction in the load, the pressure on the lower end of the valve 29 will be greater, and in excess of the differential imposed by the weight of the valve and reduced cylinder pressure, resulting in an upward movement of the plunger, increasing the pump relief so as to correspondingly reduce the pump pressure.

The valve is very sensitive to changes in pressure and quickly establishes the constant differential, so that the feed advancing of the piston will be at a uniform rate regardless of the weight of the cut or load imposed upon the piston.

The feed will continue until the collars 44 on the piston rod come in contact with the cylinder head, arresting movement of the piston and causing the hydraulic pressure delivered by the pump to increase opening the high pressure relief valve 19 so that the liquid from the pump will escape through the pipe 20 and 20ª connecting with the forward end of the control valve casing.

This action throws a pressure on the forward end of the control valve, causing the valve to move to the right until the valve comes in contact with the rear end of the body, thereby disconnecting the pump from the forward end of the cylinder and into the rear end of the cylinder, resulting in a reverse of piston movement which may be assumed as a reverse or return movement of the carriage to bring the operating machine tool elements back to a starting position. The return movement will continue until automatically or manually stopped. When slide 6 reaches the rear end of the casing, a port 18' is uncovered and connects pipe 20ª with passage 18.

The system provides for pressure regulation to adapt it for either forward or reverse feed, the arrangement as previously described being sufficient to illustrate a feed in one direction.

To feed the piston in the opposite direction, the differential pressure valve 22 and throttle valve 25 are thrown in communication with the rear end of the piston, and therefore for a feed direction change, a valve 45 is included in the system and in the diagrammatic view this valve is shown in two sections merely for convenience, and the by-passes controlled by the valve can be arranged in different planes. The valve 45 is interposed in the passage 20, 20ª, leading to one end of the control valve for throwing the line into communication with one end of the cylinder and to the opposite end through a pipe or passage 46 connecting with the valve 45.

When the valve is thrown in the proper direction, (see Figs. 2 and 3), communication will be through passage 20, valve 45 and passage 46 to the rear or right end of the cylinder and the passage 20ª is cut off. The valve is likewise interposed within the passage 24 so as to divert the fluid from the differential valve into the rear or right end of the cylinder, the valve in this instance connecting with a passage 47 which in turn connects with the passage 15. The valve is also used to control the back pressure or exhaust fluid and therefore has connection with the passage 16 through a passage 48 and a passage 49 connecting with the passage 15 whereby either of said passages 48 and 49 may be alternately thrown into communication with a passage 50 including a back pressure valve 51 and connecting with the return line or passage 10.

Figure 2:
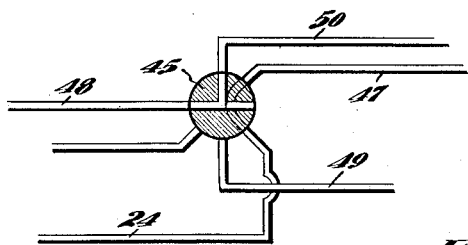
Figures 2 and 3 are diagrammatic views showing the feed control valve set in reverse position from that shown in Figure 1, or for feeding the carriage to the left.
Figure 3:
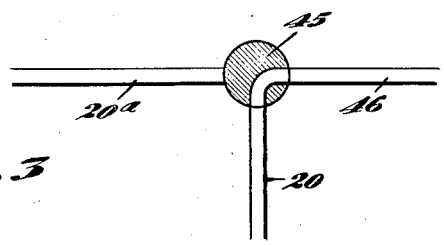

In Figure 1, the valve 45 is shown in a position for feeding the piston to the right, while the Figures 2 and 3 show the reverse position of the valve 45 for feeding the piston to the left. The valve casing has not been illustrated.

The control valve 6 is provided with a rod or stem 52 extending through one end of the cylinder thereof and is preferably provided with notches for engagement with the spring latch or index plunger 53 for locating the piston in its various positions. The end of the valve rod 52 is connected with a lever 54 which in turn is connected to a rod 55, the rod 55 carrying a number of dogs 9 for actuating the stop valve 7. The opposite end of the actuating rod 55 is connected to a hand lever 56. The control or actuating rod 55 is also connected with a three-arm lever 57, its other two arms carrying rollers 58—58 adapted to be engaged by dogs 59—59 mounted upon a rod 60 which is attached to the carriage and moves in unison therewith. The rod is shown as broken in the diagrammatic view in order to better illustrate the relation of the various units and their function.

The dogs 59—59 are set to suitable positions on the rod 60 for tripping or swinging the three-arm lever to either of alternate positions for a reverse direction control of the control valve. Likewise, the dogs 9—9 are adjustable upon the actuating rod 55 for stopping the feed or traverse in either direction. Each dog 9 has a pivoted nose 9' adapted to abut a cam faced head 7' on valve 7 to positively actuate the latter in one direction of movement of rod 5, but to be tripped by the head in the opposite direction of movement.

In the form shown in the diagrammatic view of the complete system, the throttle valve 25 is illustrated as provided with a pinion 61 connecting to the stem of the valve and in mesh with a gear 62 carrying a rack gear 63 which in turn is in mesh with rack teeth of the racks 64—64 relatively disposed at opposite sides of the rack gear 63 each having a tapered upper end for engagement with the adjustable dogs 65—65 mounted upon the trip or control rod 60, for providing an automatic operating control of the throttle valve. The upper cam noses of racks 64 are in different vertical planes parallel to rod 60, as are likewise the cam noses of dogs 65. This provides for a throttle control during the cutting period for varying the rate of feed.

In the arrangement shown in Figure 1, with the hydraulic system connected to a commercial type of lathe, the piston rod 3 is connected to the carriage by means of adjusting nuts 66. 44 and 67 indicate adjustable nuts or stop collars, the stop nuts 44 engaging the cylinder head and the stop nuts 67 engaging a bracket 68 fixed to the bed of the lathe, the stop nuts 44 engaging the cylinder head at the end of a stroke on the forward feed or in a direction to the right, and the stop nuts 67 engaging the bracket 68 when feeding towards the tailstock or toward the left.

The cylinder at its opposite ends is provided with a pair of air drain valves 70—70 connected together and to a conduit or passage 71 connecting with the tank.

Considering now the flow of liquid in the hydraulic system, the valve set as shown in Figure 1, the liquid will flow from the tank 11 by means of the pump 12 delivered through pipe or passage 13 into the control valve chamber and through pipe or passage 15 into the rear end of the cylinder, the liquid in the front of the cylinder meanwhile escaping or exhausting to the pipe or passage 16 into the control valve chamber 17 and out through the exhaust passages 18 and 10 back into the tank. This causes the return power traverse of the piston and carriage connected therewith and will continue until the right hand dog 59 engages the roll on the right hand lever arm 58, moving the rod 55 to the right and the piston rod 52 and its valve 6 to the left through the lever 54, closing the openings in the passages 15 and 16 and at the same time operating the by-pass valve 7, allowing the liquid to escape into the exhaust passages 18 and 10 back into the tank. This brings the piston to rest and the carriage in what may be termed a starting position.

Now pushing the handle lever 56 to the right to its extreme position, removes the left hand dog 9 upon the rod 55 over the by-pass valve 7, allowing the by-pass valve to close, and moves the control piston 6 to its extreme left position, connecting passages 13 and 16 intermediate the valve chamber 14, causing the liquid in pipe 16 to flow into a forward or front end of the cylinder for a forward power traverse, the liquid at the rear end of the cylinder meanwhile escaping through passage 15 into the right hand valve chamber 17' of the control valve and through a port in the valve cylinder 5, passages 18 and 10, and back into the tank.

Moving the hand lever 56 and its rod 55 to the extreme right, raises the left hand arm 58 of the lever 57 to its highest position and depresses the right hand arm 58. Movement of the piston 2 and its connected carriage will continue until the left hand dog 59, previously set for the commencement of the feed, comes in contact with the roll of the left hand arm 58, depressing it and moving the rod 55 to the left, and through the lever 54 the piston valve 6 to the right, simultaneously closing the ports to the passages 15 and 16. The nose 9' of the dog at the left is tripped so that valve 7 is not affected.

The volume of liquid then passing through pipe 13 from the pump to the intermediate chamber 14 will pass through passage 21 into the lower end of the differential pressure valve 22, at which place it is divided by the pressure regulator, the surplus volume passing out through passage 26 back into the tank, while the required volume for the feed passes through passage 24, throttle valve 25, and through the direction valve 45 into the front end of the cylinder.

During the feeding motion, the liquid in the rear end of the cylinder escapes through passage 15, passage 49, feed direction control valve 45, back pressure valve 51, passage 50, back into the tank. The back pressure valve may be of any commercial type constituting a spring pressed valve or a weighted type valve, the pressure of the spring regulated by an adjusting screw, permitting the back pressure valve to be adjusted to cause any desired back pressure on the piston for the purpose of stabilizing the feed.

Feeding motion will continue until the adjustable nut 44 on the piston rod 3 contacts with the cylinder head 4, arresting the feeding motion, causing a high pressure in all the feed passages including passage 24 to the differential pressure valve 22 and the branch passage 23 connecting with the top of the differential pressure valve 22 restricting the escape of fluid through the differential pressure valve and passage 26, thereby building up the pressure in the passage 13 to a degree which will open the pressure relief valve 19, and the volume that previously passed through passages 24 and 26 will now pass through passages 20 and 20ª into the left hand end of the cylinder of the control valve, forcing the control valve 6 to its extreme right position, the liquid at the extreme right hand end of the control valve escaping through a small port 73 into the exhaust or return passage 18 back into the tank. Any excess pressure at the left end of the valve is relieved through a port 18' and through a port similar to port 73.

The moment the piston 6 reaches the extreme right position, passages 13 and 15 will be connected to the intermediate valve chamber. The pressure will, therefore, immediately drop, relief valve 19 will close and the whole volume from the pump will pass through passage 15 into the rear end of the cylinder, causing a return power traverse which will be arrested as previously described.

The feeding direction of the piston just described, conveys the carriage in a direction toward the head stock. For conveying or feeding the carriage in a direction away from the head stock, the direction valve 45 must be moved to a reverse position, as shown in Figs. 2 and 3. In this position, passage 20 will be in connection with passage 46, and disconnected from the forward end of the control cylinder, leading and connecting with the extreme right hand end of the cylinder of the control valve.

Also, passage 24 connects through valve 45 with the passage 47, connecting with the rear end of the power cylinder. This puts the differential pressure valve in connection with the rear end of the cylinder and functions substantially the same as when connected with the forward end of the cylinder.

The direction valve 45, when thus reversed, connects the forward end of the cylinder through passage 48 with the passage 50, through back pressure valve 51, and passage 10, to the tank, so that the forward end of the cylinder is substantially the same as previously described for the rear end of cylinder when feeding in the opposite direction, and the entire operation is likewise the same.

With the hydraulic system set for feeding toward the tail stock, the direction of the operating movement of the hand lever 56 will be the reverse of that used when feeding toward the head stock, for instance, instead of pushing the lever to the right to start the cycle it will be pushed to the left, and with the feed moving in such reverse direction the stop nuts 67 are brought into play and engage with the brackets 68 for a limit control of feed, and the trip dogs on the rods 55 and 60 will have to be appropriately adjusted or one thereof moved out of commission, so that the entire hydraulic system is under automatic control. It is not deemed necessary to individually trace all the circuits and particular functioning of the devices.

After starting, the mechanism will function for any appropriate direction of carriage feed to obtain a complete cycle, constituting a rapid traverse in a direction, to bring the cutting tool to its cutting position and from thence under automatic control, feeding the carriage and its tool for a predescribed distance of feed, thereupon withdrawing the tool and returning the carriage and its tool back to its normal position, representing one cycle for ordinary turning.

The hydraulic mechanism, however, is capable of adjustment through the setting of the stops and dogs, and adding additional dogs to the number disclosed, other cycles and control can be obtained to meet various requirements. Primarily for one cycle after the hand lever has been appropriately thrown, say for moving the piston and carriage in a forward direction, the tool moves rapidly towards its cut and will continue until the appropriate dog 59 acts upon the three-arm lever 57 for moving the control valve for a liquid feeding flow through the differential pressure valve.

At the differential pressure valve the liquid is divided, the surplus liquid being disposed back into the tank while the useful or feeding liquid passes into the power cylinder. Should the feeding resistance vary at any time, the differential valve will function as previously described fc increasing or decreasing the liquid pressure of the pump as the case may require.

During the feeding action, either of the dogs, 65, depending upon the direction of feed, can be set to engage a respective rack 64 for operating the throttle valve for an increase or decrease in the rate of feed. After the piston has reached the end of its feeding stroke it will be positively arrested by the stops on the piston rod, whereupon the valve will be controlled to effect a reverse or rapid traverse to bring the piston and carriage to rest at their starting position.

The dogs 65 can also be set for a feeding rate control toward the end of a cut to change the feeding rate as the tool runs off, which is highly desirable for some classes of work, and under the tapering form of dogs and racks, the change in rate is gradual, which is also of advantage in some instances.

To cover a large range of feed, the feed dogs 65 are either made adjustable or of relative different dimensions, as shown, for effecting various throttle valve regulation.

Frequently, the amount of metal to be removed on various sections of a piece of work varies considerably. It is very desirable that automatic change of feed rate be obtained for maximum production. In some classes of work, it is desirable that when the cutter enters the work the feed rate shall be slow. Later, the feed rate may be materially increased, and thus the cutting time for a piece reduced.

On work where feeding against a shoulder or into solid metal is required, automatic decrease of rate is desirable to increase the production, and at the same time raising the grade of finish. Therefore, the dogs can be arranged and of such a character to bring about any determined throttle regulation to meet the existing conditions. The control of the throttle valve is independent of the pressure regulation which is governed by the differential pressure valve, and its control only changes the area of the restricted passage and thus varies the volume of flow between the differential pressure regulator and pump on one side and the cylinder on the other.

Thus, any desired rate of feed from zero to maximum can be obtained by merely setting the throttle valve. This change can be made during the cut if desired, and the tripping for a change of feed is very accurate and positive.

The system, therefore, comprehends any desired cycle of feed and quick traverse in either direction, together with automatic stop or feed change at any point. The controlled devices being positive in their action, are not influenced by any change in loads, requiring a decrease or increase in pressure, except that which is automatically accommodated by the differential pressure valve.

The feeding and rapid traverse circuits can be cut in and out at any point and the feed rate varied, and automatically controlled to adjust the feed rate to the amount desired for each successive carriage position. The system is extremely flexible and economical in operation, and the devices employed of very simple design, sturdy in construction, and of long life.

The feeding rate at which the piston moves for a given throttle setting does not change with the change in resistance to the movement of the piston. Greater or lesser resistance to the movement of the piston raises or lowers the pressure, with the differential valve maintaining a constant differential to insure uniformity in feed.

The differential pressure valve thus converts the pumping unit from what might normally be termed a rapid traverse capacity, into a variable feeding capacity by imposing a choke, thus dividing the volume, the required volume for the feed being delivered to the cylinder and the surplus passing back into the tank.

As the resistance is decreased, there is a correspondingly less impedance in the return of the surplus to the tank, thus, a lower back pressure, so that there is no strain on the pump other than that required for the feed.

The pump is always ready to deliver at its maximum feeding force, and can continue so for long periods without strain or perceptible wear, requires no adjustment to meet the various working conditions, and enables the use of the simplest type of pump.

Figure 4:
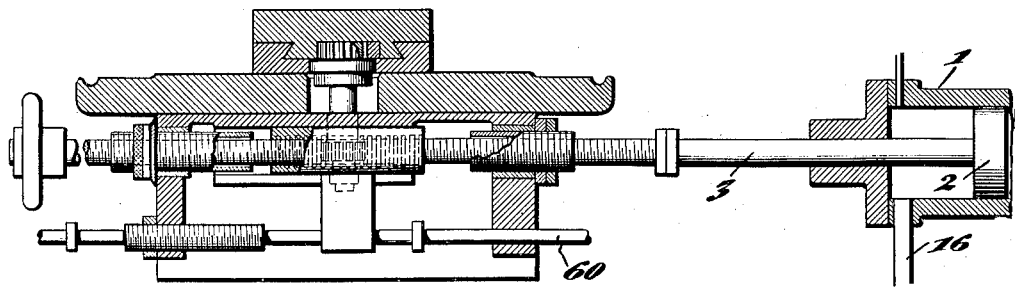
Figure 4 is a diagrammatic view showing the piston operated by the hydraulic system connected to that type of machine tool carriage shown and described in Letters Patent No. 1,600,401, dated September 21, 1926, and illustrating the connection for moving the carriage and cross slide by direct translative movement of the piston rod.

In Figure 4, the piston of the hydraulic system is shown as connecting with a feed rod of a lathe carriage of the type as shown in said aforesaid patent. The feed rod reciprocating with the piston is connected to a sleeve having a rack on one side for transmission connection with the tool slide, substantially as disclosed in said patent.

The sleeve is disposed between opposing abutments on the carriage, the abutments spaced to provide an intermediate non-carriage feeding traverse of the sleeve rack for independent tool slide feed. When the rack abuttingly engages the carriage in either direction of piston movement the carriage and slide move as a unit and in either direction of piston movement.

The structure illustrated permits the sleeve rack to be adjusted upon the feed rod for carriage adjustment upon the lathe bed by manually rotating the feed rod. For further description of the parts of this lathe organization reference is made to said patent, the disclosure herein being sufficient for the present purpose to feature a feed for the carriage and tool slide through the reciprocation of a feed rod actuated by a piston, the piston under control for feed and traverse rates of motion.

The tool slide is thus capable of being fed to and from the work, while the carriage is at rest, and subsequent feed with the carriage longitudinally of the work.

Having described my invention, I claim:

1. A valve device for hydraulic feed system, the valve dividing and controlling a pump delivery, comprising a valve body formed with communicating inlet and restricted outlet and a valve controlled second outlet, the inlet connecting with a pump supply, the restricted outlet with a cylinder, and the valve controlled second outlet as a regulatable escape, and a valve for said second outlet exposed to relatively opposing cylinder and pump pressures, with the prevailing pressure moving said valve for operative control, and the valve normally imposing a determined resistance upon the pump volume to establish a constant differential between pump and cylinder pressures.

2. In a lathe, a carriage, a tool slide thereon, a reciprocating feed rod, a member on said feed rod moving therewith and in transmission connection with said tool slide and having a determined non-carriage engaging motion for tool slide feed and engageable with the carriage for carriage feed with the slide as a unit, and hydraulic means including a piston and cylinder for reciprocating said feed rod, controllable for moving the piston at feeding and rapid traverse rates.

3. In a machine of the class described, a reciprocable member, a cylinder and piston, one of which is connected with said member, fluid pressure generating means, a fast feed conduit and a slow feed conduit connecting the generator with an end of the cylinder, and a valve operated by the member in its advance under fast feed to cut in the slow feed conduit at a predetermined point.

4. In a machine of the class described, a reciprocable member subject to variable resistance to its movement, a cylinder and piston, one of which is connected with said member to move it, a source of fluid under pressure, conduits adapted to connect the source with either end of the cylinder, valve means controllable to connect the source alternately with said conduits to reciprocate the piston, an escape valve between the source and cylinder to control the pressure supply to the latter, said escape valve including a movable element and having an escape orifice controlled by said element, and a connection for imposing the varying pressure within the cylinder upon said movable element to vary the escape through said orifice.

5. In a machine of the class described, a reciprocable member subject to variable resistance to its movement, a cylinder and piston, one of which is connected with said member to move it, a source of fluid under pressure, conduits adapted to connect the source with either end of the cylinder, valve means controllable to connect the source alternately with said conduits to reciprocate the piston, an escape valve between the source and cylinder to control the pressure supply to the latter, said escape valve including a movable element and having an escape orifice controlled by said element, a connection for imposing the varying pressure within the cylinder upon said movable element to vary the escape through said orifice, and mechanical means yieldingly urging said movable element in closing relation to said orifice.

6. In a machine of the class described, a reciprocable member subject to variable resistance to its movement, a cylinder and piston, one of which is connected with said member to move it, a source of fluid under pressure, conduits adapted to connect the source with either end of the cylinder, valve means controllable to connect the source alternately with said conduits to reciprocate the piston, an escape valve between the source and cylinder to control the pressure supply to the latter, said escape valve including a movable element and having an escape orifice controlled by said element, a connection for imposing the varying pressure within the cylinder upon said movable element to vary the escape through said orifice, and controllable flow restricting means interposed between said escape valve and cylinder.

7. In a machine of the class described, a reciprocable member subject to variable resistance to its movement, a cylinder and piston, one of which is connected with said member to move it, a source of fluid under pressure, conduits adapted to connect the source with either end of the cylinder, valve means controllable to connect the source alternately with said conduits to reciprocate the piston, an escape valve between the source and cylinder to control the pressure supply to the latter, said escape valve including a movable element and having an escape orifice controlled by said element, a connection for imposing the varying pressure within the cylinder upon said movable element to vary the escape through said orifice, mechanical means yieldingly urging said movable element in closing relation to said orifice, and controllable flow restricting means interposed between said escape valve and cylinder.

8. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder, said valve operable to connect the supply conduit with either the fast or slow feed conduit, and means controlled by movement of said member to move the valve to throw the supply from the fast to the slow feed conduit.

9. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder, said valve operable to connect the supply conduit with either the fast or slow feed conduit, an escape valve in the slow feed conduit, and means for controlling said escape valve in dependence upon the fluid pressure existing in the cylinder.

10. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder, said valve operable to connect the supply conduit with either the fast or slow feed conduit, means controlled by movement of said members to move the valve to throw the supply from the fast to the slow feed element, an escape valve in the slow feed conduit, and means for controlling said escape valve in dependence upon the fluid pressure existing in the cylinder.

11. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder at one end of the latter, and a fast feed conduit connecting the valve and cylinder at the other end of the latter, said valve being operative to connect the supply conduit with either of the fast feed conduits or the slow feed conduit.

12. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder at one end of the latter, a fast feed conduit connecting the valve and cylinder at the other end of the latter, said valve being operative to connect the supply conduit with either of the fast feed conduits or the slow feed conduit, and means controlled by movement of said member in one direction to move the valve to throw the supply from the first mentioned fast feed conduit to the slow feed conduit.

13. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder at one end of the latter, a fast feed conduit connecting the valve and cylinder at the other end of the latter, said valve being operative to connect the supply conduit with either of the fast feed conduits or the slow feed conduit, means controlled by movement of said member in one direction to move the valve to throw the supply from the first mentioned fast feed conduit to the slow feed conduit, and means automatically actuated at the limit of movement of said member in one direction to move the valve to throw the supply to the second mentioned fast feed conduit.

14. In a machine of the class described, a reciprocable member, a cylinder and piston, one of which is secured to said member, a source of fluid under pressure, a valve, a supply conduit connecting said source and valve, a fast feed conduit and a slow feed conduit connecting said valve and cylinder at one end of the latter, a fast feed conduit connecting the valve and cylinder at the other end of the latter, said valve being operative to connect the supply conduit with either of the fast feed conduits or the slow feed conduit, and a valve operable to reverse the relation of said feed conduits to the cylinder ends.

15. In a machine of the class described, a reciprocable member, a cylinder and piston, one of which is connected with said member, a source of fluid under pressure, conduits connecting said source with the cylinder ends, a valve operable to control one of the conduits for feed to the cylinder and the other for discharge therefrom, means actuated upon movement of said member in one direction to move said control valve to connect the fluid supply for movement of the member in the opposite direction, and an exhaust valve for the fluid pressure medium automatically opened upon such movement of the control valve.

16. In a machine of the class described, a reciprocable member, a cylinder and piston, one of which is connected with said member, a source of fluid under pressure, conduits connecting said source with the cylinder ends, a valve operable to control one of the conduits for feed to the cylinder and the other for discharge therefrom, means actuated upon movement of said member in one direction to move said control valve to connect the fluid supply for movement of the member in the opposite direction, a dog movable with said member, a spring-closed exhaust valve for the fluid pressure medium, and means on said exhaust valve engaged by the dog to open the exhaust valve as the control valve is moved as above specified.

17. In a machine of the class described, a reciprocable member, a cylinder and piston, one of which is connected with said member, a source of fluid under pressure, a valve comprising an element movable to control pressure fluid supply to said cylinder for either fast or slow feed or fast return, fast and slow feed conduits connecting said valve and one end of the cylinder and a return conduit connecting said valve and the other end of the cylinder, said valve having limit positions wherein it connects the source to the return conduit or to the fast feed conduit, respectively, and an intermediate position wherein it connects the source to the slow feed conduit, means for moving said valve to intermediate position at the end of the return movement of said member, and an exhaust valve for the fluid pressure medium automatically opened when the control valve is so moved.

18. In a machine of the class described, a reciprocable member, a cylinder and piston, one of which is connected with said member, a source of fluid under pressure, a valve comprising an element movable to control pressure fluid supply to said cylinder for either fast or slow feed or fast return, fast and slow feed conduits connecting said valve and one end of the cylinder and a return conduit connecting said valve and the other end of the cylinder, said valve having limit positions wherein it connects the source to the return conduit or to the fast feed conduit, respectively, and an intermediate position wherein it connects the source to the slow feed conduit, means for moving said valve to intermediate position at the end of the return movement of said member, and an exhaust valve for the fluid pressure medium automatically opened when the control valve is so moved, said control valve being movable from fast feed position to slow feed position without opening said exhaust valve.

HERMAN J. BREITENBACH.